United States Patent [19]
Larsen et al.

[11] Patent Number: 6,021,035
[45] Date of Patent: Feb. 1, 2000

[54] APPARATUS FOR PROTECTION OF POWER-ELECTRONICS IN SERIES COMPENSATING SYSTEMS

[75] Inventors: Einar V. Larsen, Saratoga, N.Y.; Allen M. Ritter, Roanoke, Va.

[73] Assignee: General Electric Company, Schenectady, N.Y.

[21] Appl. No.: 09/041,748

[22] Filed: Mar. 13, 1998

Related U.S. Application Data

[63] Continuation-in-part of application No. 08/454,671, May 31, 1995, Pat. No. 5,734,256.

[51] Int. Cl.[7] .................................................. H02H 9/00
[52] U.S. Cl. ................................. 361/54; 363/54
[58] Field of Search ................................ 361/16, 17, 18, 361/20, 21, 52, 54, 56–58, 63, 65; 323/205, 207, 208, 209; 363/54

[56] References Cited

U.S. PATENT DOCUMENTS

| | | | |
|---|---|---|---|
| 3,825,815 | 7/1974 | Gyugyi et al. | 321/4 A |
| 4,513,240 | 4/1985 | Putnam | 323/210 |
| 4,639,846 | 1/1987 | Dähler et al. | 363/39 |
| 4,651,265 | 3/1987 | Stacey et al. | 363/35 |
| 4,697,131 | 9/1987 | Schauder et al. | 318/462 |
| 4,805,082 | 2/1989 | Heinrich et al. | 363/129 |
| 4,812,699 | 3/1989 | Ogawa et al. | 310/316 |
| 4,843,513 | 6/1989 | Edris | 361/20 |
| 4,870,557 | 9/1989 | Stacey | 363/43 |
| 5,198,746 | 3/1993 | Gyugyi et al. | 323/207 |
| 5,202,583 | 4/1993 | Larsen et al. | 307/102 |
| 5,227,713 | 7/1993 | Bowler et al. | 322/58 |
| 5,287,288 | 2/1994 | Brennen et al. | 364/483 |
| 5,291,120 | 3/1994 | Leowald et al. | 323/209 |
| 5,319,534 | 6/1994 | Brennen | 363/40 |
| 5,319,535 | 6/1994 | Brennen | 363/40 |
| 5,343,139 | 8/1994 | Gyugyi et al. | 323/207 |
| 5,374,853 | 12/1994 | Larsen et al. | 307/102 |
| 5,384,528 | 1/1995 | Leowald et al. | 323/209 |
| 5,392,184 | 2/1995 | Unterlass et al. | 361/16 |
| 5,424,627 | 6/1995 | Clark et al. | 323/210 |
| 5,469,044 | 11/1995 | Gyugyi et al. | 323/207 |
| 5,489,838 | 2/1996 | Leowald et al. | 323/210 |

*Primary Examiner*—Ronald W. Leja
*Attorney, Agent, or Firm*—Wayne O. Travnham

[57] ABSTRACT

An active power line compensation circuit for providing a power distribution network with a series compensation system that utilizes a transformer-coupled three-phase voltage-source inverter. A solid-state thyristor shorting ("crowbar") switch is provided on a third winding of a coupling series transformer. The transformer couples the ac output of a three-phase voltage-source inverter (VSI) to the power distribution network. The crowbar switch circuitry utilizes three diode-thyristor pairs, where each pair is connected to one phase leg of the VSI. The thyristors of the crowbar switch are each controlled by an fault output signal from an overcurrent or overvoltage sensor, that is coupled to a tertiary winding of the transformer. The fault signal closes the thyristors and thereby shunts overcurrent that would otherwise flow through the VSI. When the fault signal ceases, the thyristors automatically switch open when a null current is present in the normal three-phase line current.

8 Claims, 4 Drawing Sheets

APPARATUS FOR PROTECTION OF POWER-ELECTRONICS IN SERIES COMPENSATING SYSTEMS

RELATED APPLICATION

This is a continuation-in-part application to U.S. patent application Ser. No. 08/454,671, filed May 31, 1995, and issued as U.S. Pat. No. 5,734,256, on Mar. 31, 1998.

FIELD OF THE INVENTION

This invention relates generally to active series compensation systems in electric power transmission systems and, more particularly, to the protection of the solid-state power-electronic devices in a series compensation system (SCS) against severe overcurrents caused during fault conditions.

BACKGROUND AND SUMMARY OF THE INVENTION

Series connected impedance compensating systems are generally known and used for the dynamic balancing of reactive voltages on a power transmission line in response to varying load demands. Traditionally, compensating circuits have often employed some form of series connected capacitor arrangement. It is also known to utilize active solid-state components as part of an overall series compensating system in electric power transmission networks. Such arrangements, often referred to as a Unified Power Flow Controller (UPFC) or an Active Power Line Conditioner (APLC), may employ voltage-source inverters to inject a voltage in series with the source such that the load voltage is of a desired magnitude and phase with respect to the source voltage. An example is of such a system is provided in U.S. Pat. No. 5,198,746 to Gyugyi et al., entitled "Transmission line Dynamic Impedance Compensation System".

Because the injected series voltage comprises only a small fraction of the total load voltage, series compensating systems are not very effective in controlling large current flows which can occur during fault conditions (e.g., due to lighting strikes or ground fault switching transients). In an electrical power transmission network (or "supply network") currents that flow during a short-circuit imposed on the network are predominantly governed by the source voltage and series line impedance of the network. During many fault conditions, such currents can potentially reach ten or twenty times the maximum rated current handling capacity of the power electronics used in conventional impedance compensating systems. It is desirable to protect the active power electronics of such systems against damage due to high current surges associated with fault conditions. One approach to providing such protection is demonstrated by U.S. Pat. No. 5,287,288 to Brennen et al. which discloses an active power line conditioner that employs a pair of opposing thyristors for forming a "crowbar switch" across the ac output of a transformer-coupled series voltage-source inverter (VSI). The crowbar switch provides a shorting path for shunting excess currents and thereby protects the VSI.

The Brennen et al. patent describes a dual thyristor crowbar switch triggered by a somewhat complicated rectifying bridge and Zener diode arrangement that senses overcurrents by detecting overvoltages at the ac side of the series inverter. Such an arrangement requires many components and inevitably increases the expense and decreases the overall reliability of the compensation system. The present invention provides an improved overcurrent sensing arrangement that monitors voltage fluctuations at a transformer coupling for the VSI or at the VSI, and provides an improved crowbar switch structure having few active components and simple to control. These improvements result in providing protection of power electronics for series compensating systems that is more reliable, lower in cost and particularly suitable for use in three-phase power distribution systems.

In one exemplary embodiment of the present invention (FIGS. 3 and 4), a conventional metal oxide varistor (MOV)—bypass breaker combination may be provided on the line side of a coupling series transformer (T). The coupling transformer includes a tertiary winding that is used to detect over-voltages in the line and is coupled to a current shunting thyristor "crowbar" switch ($S_{CB}$). The series transformer includes a primary winding to which the VSI circuit is coupled and a secondary winding to which the line is connected. Alternating current from the VSI circuit flows through the primary winding and is picked-up by the secondary winding which provides the ac current to the line.

Each power phase leg of the VSI has three states with respect to the gating of the active portion, namely "high", "low", or "blocked." In the high state, the active device connected to the positive dc bus (source link) is gated "on", and the active device connected to the negative dc bus is gated "off." In the low state, the active device connected to the negative dc bus is gated "on" and the active device connected to the positive dc bus is gated "off." During these states inverter current will flow either in the active device that is gated to the "on" state or in the opposing diode. Conversely, in the blocked state both upper and lower active devices are gated off and current is forced to flow only through the diodes. During normal control, the inverter legs are switched between the high and low states to manage the dc voltage as desired. When outside forces cause the VSI voltage to exceed the rating of the active device, overcurrent protection is necessary to prevent damage to the VSI since its active solid-state devices generally cannot survive a turn-off event under excessive current.

The tertiary winding is between the primary and secondary windings of the transformer. If the tertiary winding is shunted by the crowbar switch, then the magnetic flux in the transformer is interrupted, and the VSI circuit is effectively isolated from the line by the transformer. A current sensor detects excessive current conditions at the tertiary winding and signals the crowbar switch to close the thyristors when an over-current condition is detected. The closed thyristors shunt the current in the tertiary winding and thereby isolate the VSI from the line. When the excessive current condition subsides then the thyristors automatically open to allow current to flow to the VSI.

Overvoltage protection is provided in one embodiment of the present invention by the third winding of the coupling transformer and a crowbar switch ($S_{CB}$) coupled to the third winding. When an excessive voltage or current pulse the line ($L_{line}$), an overvoltage condition in the coupling transformer at the third winding where it is detected by a voltage sensor coupled that third winding of the transformer. The sensor is associated with a crowbar switch circuit, and generates a signal to trigger a current shunting thyristor "crowbar" switch ($S_{CB}$). The signal closes three thyristors (where one thyristor corresponds to each line (phase) of the line current) to shunt the current in the third winding of the transformer. The closed thyristors short out the third winding such that all current goes to this winding instead of the secondary winding associated with the VSI inverter. The transformer is a series transformer with the third winding between the windings coupling the line and the VSI circuit to the transformer.

As the crowbar circuit shunts current in the third winding, the magnetic flux flow in the transformer stops which isolates the line from the VSI circuit.

Once the overcurrent pulse or condition subsides, the thyristors in the crowbar switch each automatically open when the phases of the line current next present a null current condition at the thyristor. When the thyristors open in the crowbar circuit, current flows again through the secondary winding which allows the transformer to coupled the VSI circuit to the line. Accordingly, the third winding and crowbar circuit protects the VSI circuit from voltage spikes and overcurrents in the line by shunting current to the third winding when such spikes and overcurrents are detected.

In accordance with the present invention, the improved crowbar switch circuitry utilizes pairs of diodes and thyristors for each leg (phase) of the line current. For overcurrent protection, the thyristors are operated by a control circuit that is triggered by a sensor detecting overcurrents at the tertiary winding. The crowbar circuit of the present invention is believed to be less expensive than the overcurrent protection circuit shown in the Brennen et al. patent that has anti-parallel thyristors for each phase of the line current. In addition, the crowbar switch does not require an external gate signal for activation. The switch is activated by a sensor that monitors the current on the third winding of the transformer. When the current increases beyond a threshold, the thyristors of the switch close to shunt current through the third winding and the switch. When the current drops below the threshold, the thyristors return to their normal open state.

In addition, because the crowbar switch is somewhat isolated from the VSI circuit by the third transformer winding, the voltage and current ratings for the crowbar circuit can be selected independently of the voltage and current ratings of the VSI circuit.

BRIEF DESCRIPTION OF THE DRAWINGS

These and other features and advantages of the present invention will become more completely understood by referring to the following detailed description of presently preferred exemplary embodiments in conjunction with the FIGURES in which like reference numerals refer to like elements throughout.

DETAILED DESCRIPTION OF THE DRAWINGS

In the following description, for purposes of explanation and not limitation, specific details are set forth, such as particular circuits, circuit components, interfaces, techniques, etc. to provide a thorough understanding of the present invention. It will be apparent to one skilled in the art that the present invention may be practiced in other equivalent embodiments that depart from these specific details, of the disclosed embodiment. In other instances, detailed descriptions of well known methods and programming procedures, devices, and circuits are omitted so not to obscure the description of the present invention with unnecessary detail.

Figure 1:
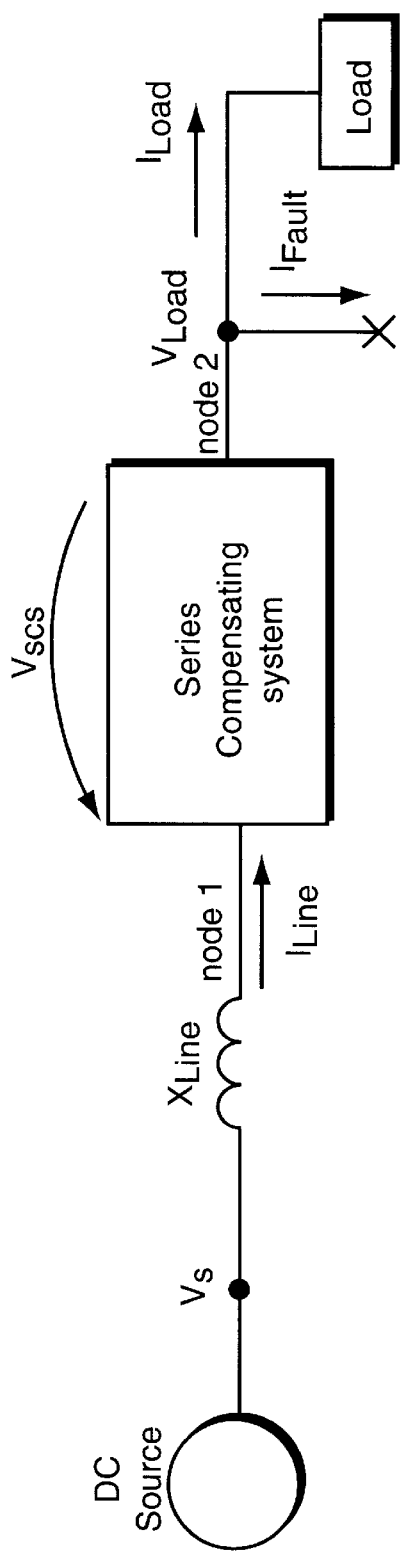
FIG. 1 is a voltage and current flow diagram of an electric power transmission network including a series compensating system with a fault on the transmission line.

FIG. 1 illustrates the basic elements of an electric power transmission system, including a series compensating system, shown with a fault current imposed on the power transmission line. The magnitude of fault current, $I_{Fault}$, at node 2 is predominantly governed by the source voltage ($V_s$) and the series impedance ($X_{Line}$) at node 1 of the system.

Figure 2:
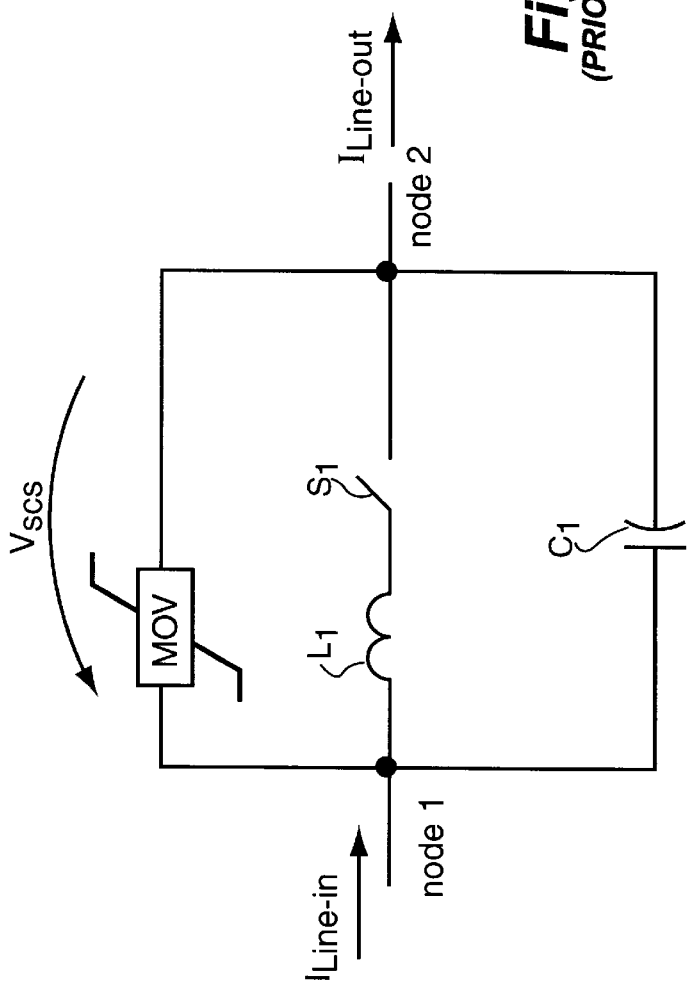
FIG. 2 is a schematic of a conventional prior art protection scheme for a series capacitor compensating system.

FIG. 2 illustrates the basic conventional prior art protection scheme for a series capacitor-type (C) compensating system, positioned between a line-in node 1 ($I_{Line}$) and a line-out node 2. In this arrangement the first line of protection consists of an overvoltage-limiting device, such as a metal-oxide varistor (MOV), which provides a absolute limit on the maximum voltage that can be seen by the series compensating device. In addition, to protect the MOV, an active bypass breaker device, $S_1$, is used to shunt excessive currents around the MOV (conventionally three types of bypass switches are used: a fast-closing breaker, a triggered air gap, or a solid-state thyristor arrangement). A current-limiting inductor, ($L_1$), is also provided to ensure safe switching.

Figure 3:
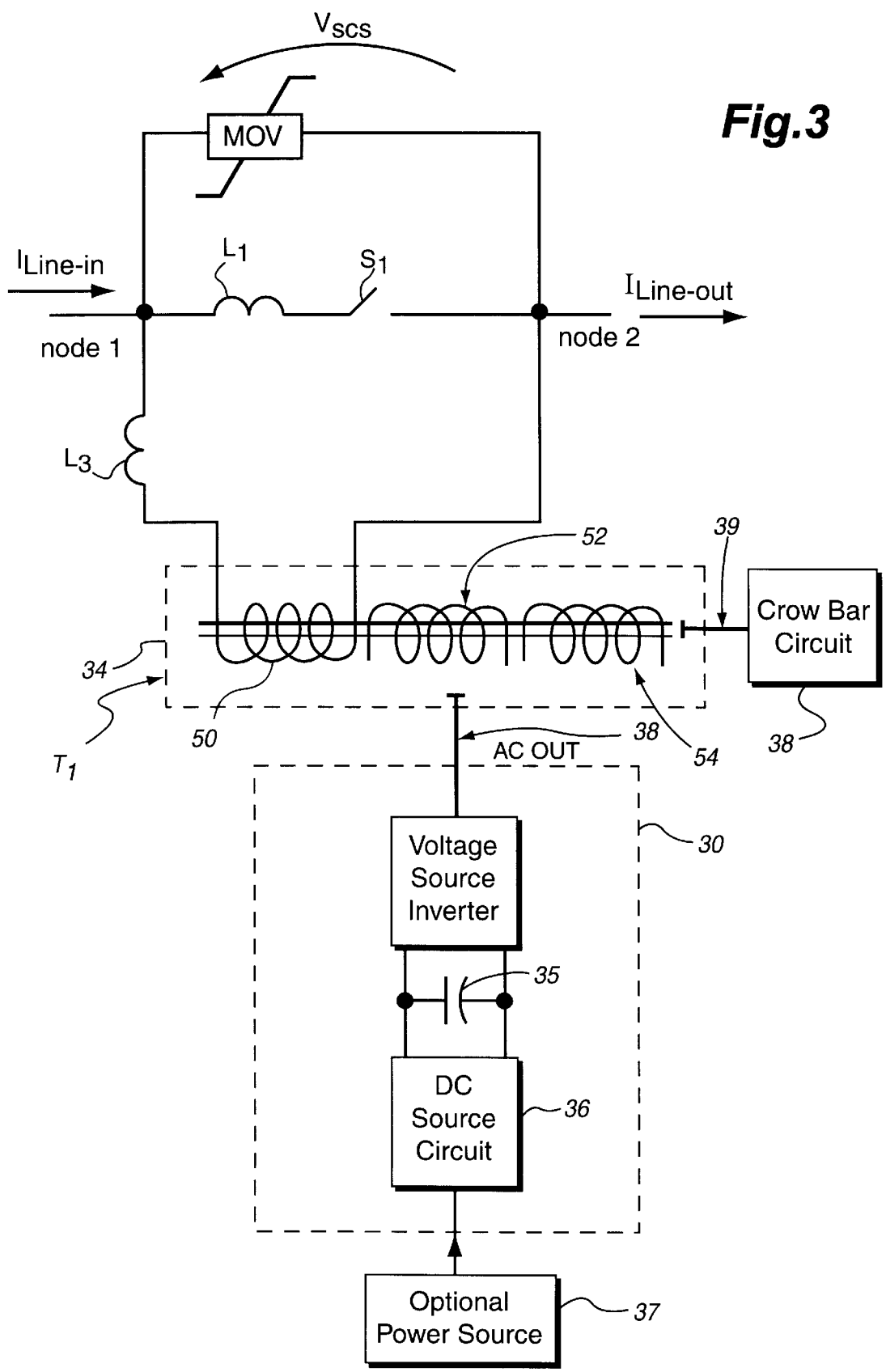
FIG. 3 is a block schematic diagram of a single line (phase) of a three-phase series compensating system in accordance with the present invention.

FIG. 3 depicts the basic circuit configuration for a single phase line (leg) of a three-phase transformer coupled series compensation active power line compensating system 30. The actual circuit would include components for each of the three legs of the three-phase power system. The compensating system 30 includes a solid-state three-phase inverter 32, and a parallel link capacitor 35, and a dc source 36 into the electric power transmission system ($I_{line}$). A line compensation system 30 may also receive power from an optional power source 37. The ac output 38 of the compensating system 30 is coupled across a primary winding 52 (Δ-connection of three wires, one for each phase) of a coupling series transformer 34.

The transformer (T1) 34 includes a primary winding 50 that is coupled to the VSI inverter 32, a secondary winding 52 that is coupled to the line ($I_{line}$), and a tertiary winding 54 that is coupled to the crowbar circuit (Scb) 38. The tertiary winding may be connected to a sensor circuit (see FIG. 4) that, during a line overcurrent condition, generates a signal to trigger the crowbar circuit to shunt current and protect the VSI 32. A current-limiting inductance, $L_{CB}$, is provided by inductor 39 to insure safe switching of crowbar switch 38.

Figure 4:
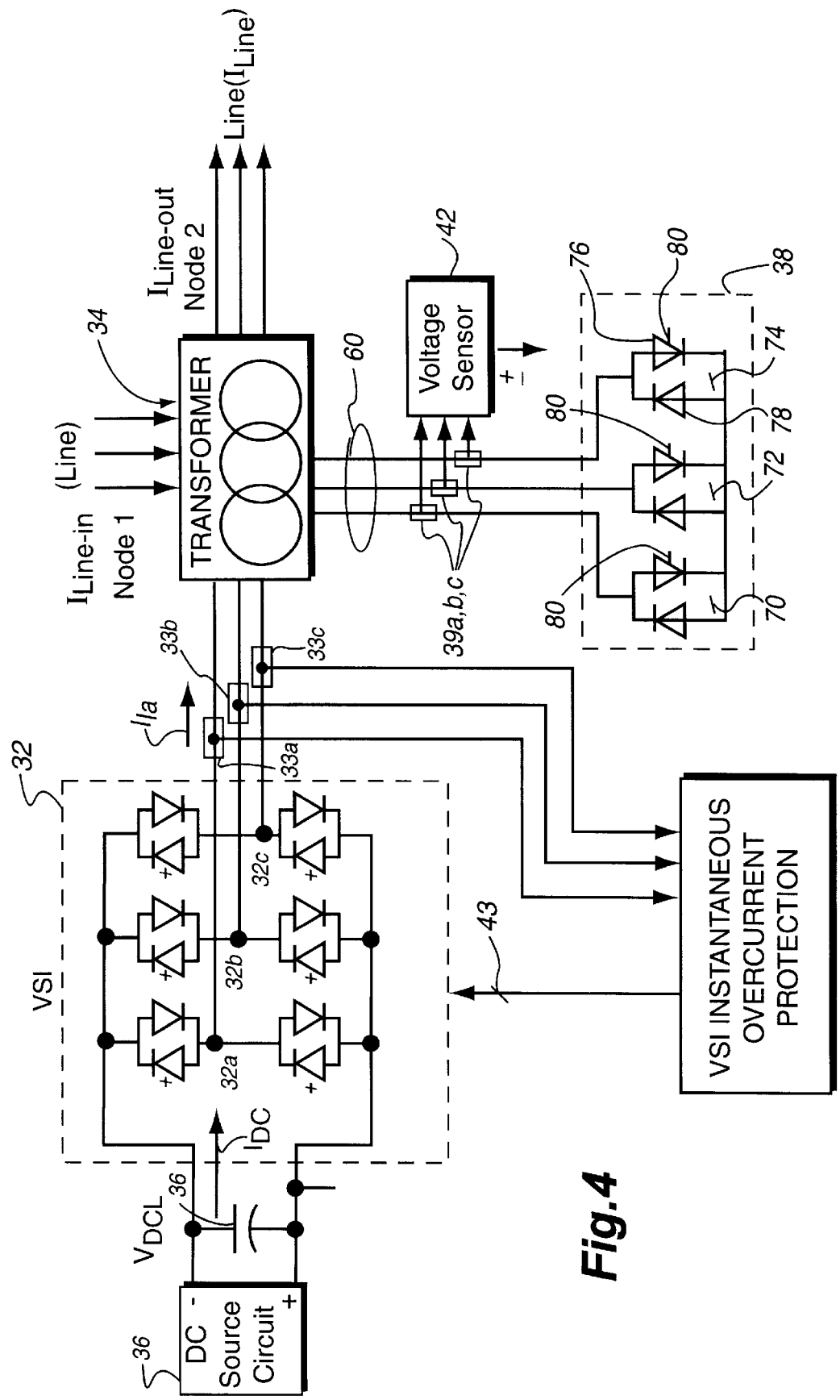
FIG. 4 is a detailed schematic illustrating an exemplary embodiment of a three-phase SCS protection circuit in accordance with the present invention.

FIG. 4 shows a detailed schematic three-line diagram of an exemplary embodiment of the three-phase SCS protection circuit. Three-phase voltage-source inverter 32 comprises a plurality of thyristor switching element pairs 32a–32c, e.g., one pair for each phase leg. The output of the voltage-source inverter 32 coupled across the primary winding of the transformer 34. Overcurrent detection circuitry 41 monitors current $I_{Ia}$–$I_{Ic}$ on each phase leg using conventional current sensing devices 33a–33c, and controls conduction states of thyristor element pairs 32a–32c via control input lines 43 to immediately inhibit the active portion of each phase-leg of voltage-source inverter 32 whenever the current exceeds a predetermined level. DC current VDCL is provided by DC source 36 across capacitor 35.

The solid-state crowbar circuit 38 is coupled via a power conductor bus 39 to the tertiary winding of the series coupling transformer 34. The crow-bar circuit 38 is a three phase circuit that comprises three pairs 70, 72 and 74 of thyristors 76 and diodes 78, where is thyristor/diode pair is connected to a phase leg of the transformer. A inductance 39*a, b* and *c* in the power buses 60 to the crowbar circuit is detected by voltage sensor 42, which triggers the crowbar circuit when an over-voltage condition is detected. The control gate 80 of each of the thyristors is connected to the voltage sensor 42. When the sensor 42 generates a trigger (t) signal, the control gates 80 open each thyristor 76 to shunt the current in the third winding of the transformer 34. Shunting current to the third winding, prevents flux flow in the transformer between the primary and secondary winding and effectively isolates the VSI circuit 32 from the line (Lline).

The voltage/current sensor 42 may be any of several conventional circuits, such as a diode bridge with Zener center diode, which conducts current when an overcurrent condition exists in the tertiary winding. Persons of ordinary skill in the art will be familiar with suitable voltage/current detection sensors for detecting an overcurrent or overvoltage condition across the tertiary winding 54.

Figure 5:
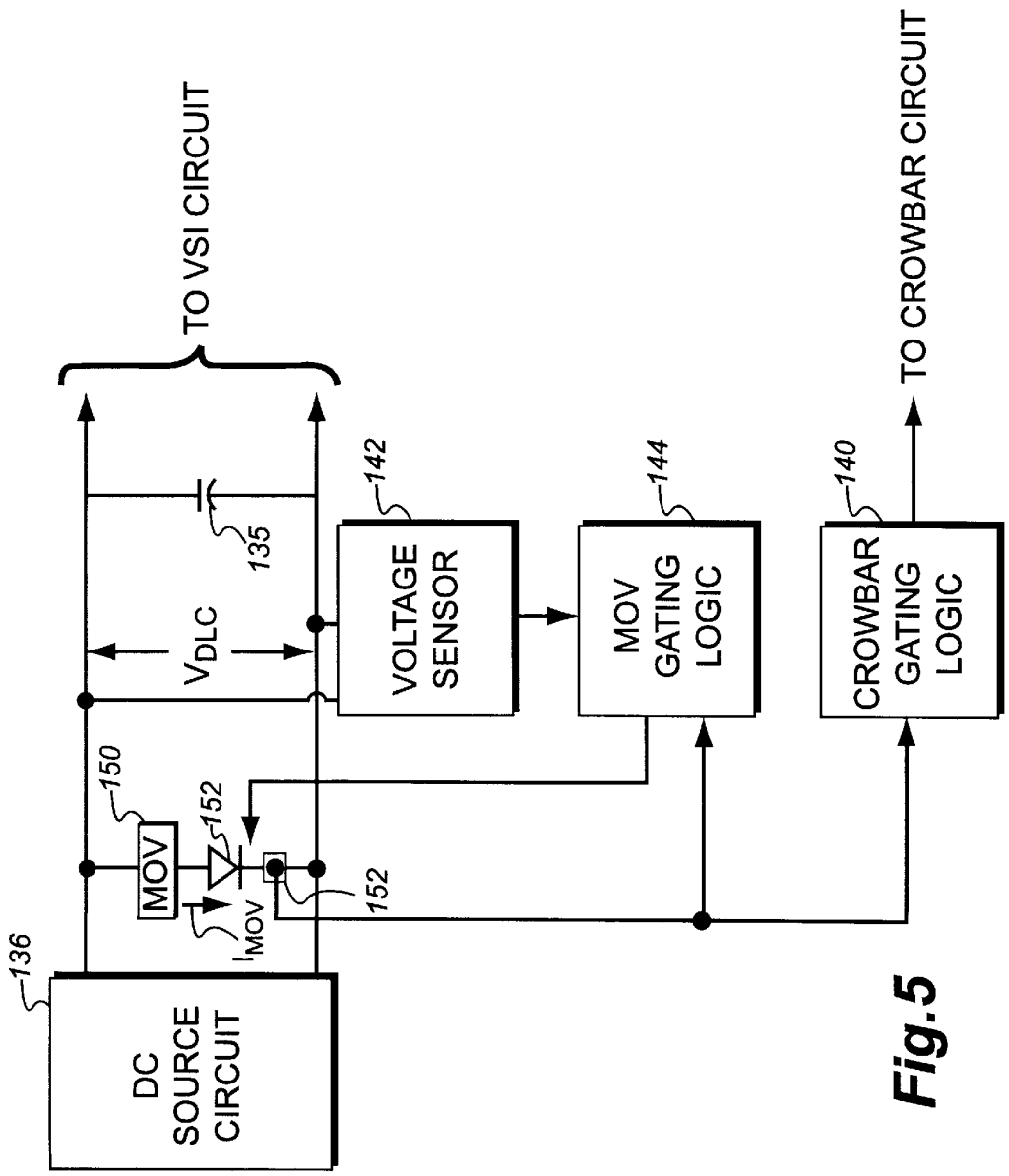
FIG. 5 shows an alternative embodiment of a three-phase SCS protection circuit, in accordance with the present invention.

Referring now to FIG. 5, an additional and/or optional embodiment of the present invention for protecting voltage-source inverter power electronics in an electrical power distribution network compensating system is discussed. In accordance with this further embodiment of the present invention, a thyristor-switched MOV device is provided across the dc source link in parallel with the dc source and the dc link capacitor (VSI circuit not shown). Voltage sensor 142 cooperates with MOV gating logic 144 to detect source link voltages greater than a predetermined reference voltage and to trigger thyristor device (preferably GTO type) 151. Voltage sensor 142 and MOV logic 144 comprise conventional sensing and triggering circuitry configured to instantaneously turn "on" thyristor 151 when dc link voltage, $V_{DCL}$, exceeds a predetermined threshold, thus allowing MOV 150 to shunt slight overcurrents across link capacitor 135. Conventional current sensing 152 provides a measure of MOV current, $I_{MOV}$, to MOV gating logic 144 and crowbar gating logic 140, which allows MOV gating logic 144 to turn thyristor 151 "off" when MOV current drops below a predetermined threshold and crowbar gating logic 140 to activate the crowbar switch (see FIG. 4) when the measured MOV amp-seconds exceeds a predetermined threshold. As previously discussed, crowbar gating logic 140 may also turn the crowbar switch "off" when the crowbar current drops below a predetermined threshold.

Figure 6:
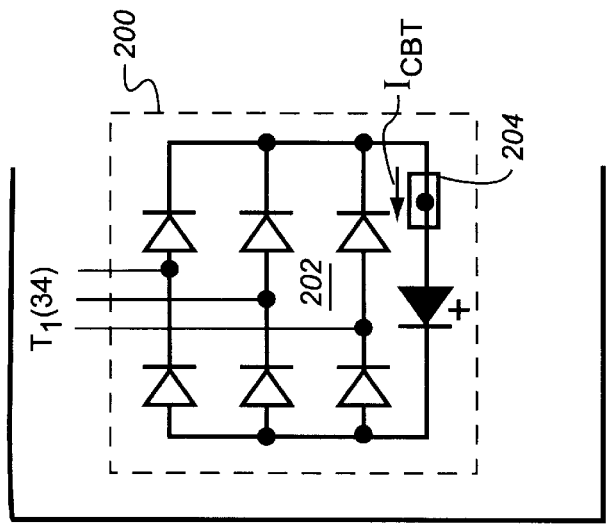
FIG. 6 shows an alternative crowbar circuit in accordance with the present invention.

FIG. 6 shows an alternative crowbar circuit 200, which may be substituted for the crowbar circuit 38 shown in FIG. 4. Solid-state crowbar circuit 200 is provided on the tertiary winding side of coupling transformer T1 (see FIG. 3), and consists (in its simplest form) of a diode bridge 202 feeding a single thyristor 204. Although alternative crowbar switch configurations could also be implemented, such as a back-to-back thyristor combination on each of three phases, an alternative embodiment of the present invention utilizes a diode bridge with a thyristor on the dc side of the bridge (resulting in the simplification that only one active device need be gated per phase leg). Since an excessive voltage at the dc input link to the voltage-source inverter is indicative of an abnormal condition, crowbar switch logic circuit 140 or voltage sensor 42 provides a gate trigger signal to thyristor 204, triggering conduction of crowbar switch 200.

While the invention has been described in connection with what is presently considered to be most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus for protection of voltage-source inverter electronics in an electrical power distribution network, comprising:

a series transformer having a secondary winding coupled to the power distribution network, a primary winding coupled to the voltage-source inverter electronics, and a tertiary winding between the secondary and primary windings, and a solid-state shorting crowbar switch connected to the tertiary winding for shunting the tertiary winding and thereby isolating at the transformer the voltage-source inverter electronics from the power distribution network.

2. The apparatus for protection of voltage-source inverter electronics as set forth in claim 1, further comprising a sensor coupled to the transformer for detecting an overcurrent or overvoltage condition, and generating a signal when said condition exits, and wherein said crowbar switch includes at least one thyristor that is triggered closed by the signal from the sensor.

3. The apparatus for protection of voltage-source inverter electronics as set forth in claim 1, wherein said crowbar switch includes three pairs of parallel thyristors and diodes, where each pair is coupled to a phase leg of a three phase line from the power distribution network.

4. The apparatus for protection of voltage-source inverter electronics as set forth in claim 1, wherein the crowbar switch includes a parallel pair of a thyristor and a diode, where the pair is connected to shunt current in the tertiary winding when the thyristor is triggered.

5. An apparatus for protection of voltage-source inverter electronics for a three-phase power distribution system, where said voltage source inverter electronics is coupled by a series transformer to said power distribution system, and said apparatus comprises:

primary, secondary and tertiary windings on said series transformer, where the primary winding is coupled to the voltage source inverter electronics, and the secondary winding is coupled to the power distribution system;

a voltage or current sensor coupled to said tertiary winding for generating a fault signal when an fault condition is present in the tertiary winding, and a solid-state crowbar circuit coupled to said tertiary winding including a diode and thyristor parallel pair in line with each phase of said transformer coupling, where each thyristor includes a control gate triggered by the fault signal of the voltage or current sensor.

6. A method for the protection against electrical damage of a voltage-source inverter in a power compensation circuit for an electrical power distribution network, where the power compensation circuit is coupled by a transformer to the power distribution network, said method comprising:

(a) monitoring a voltage at or current across a tertiary winding of the transformer;

(b) generating a fault signal when an overcurrent or overvoltage condition is detected in the tertiary winding; and (c) shunting current in the tertiary winding in response to the fault signal to interrupt flux flow in the transformer and isolate the voltage-source inverter from the electrical power distribution network at the transformer.

7. The method of claim 6 wherein in step (c) a crowbar circuit shunts current in the tertiary winding, and the fault signal is applied to a control gate of at least one thyristor in the crowbar circuit, where the thyristor switches states upon application of the fault signal.

8. The method of claim 7 wherein the at least one thyristor comprises at least one diode and thyristor, and the method further comprises step (d) of automatically switching states of the thyristor after cessation of the fault signal and continuation of a three-phase ac current through the tertiary winding.

* * * * *